(No Model.) 2 Sheets—Sheet 2.
W. GOWEN.
OFFSETTING DEVICE FOR SAW MILL CARRIAGES.
No. 401,944. Patented Apr. 23, 1889.
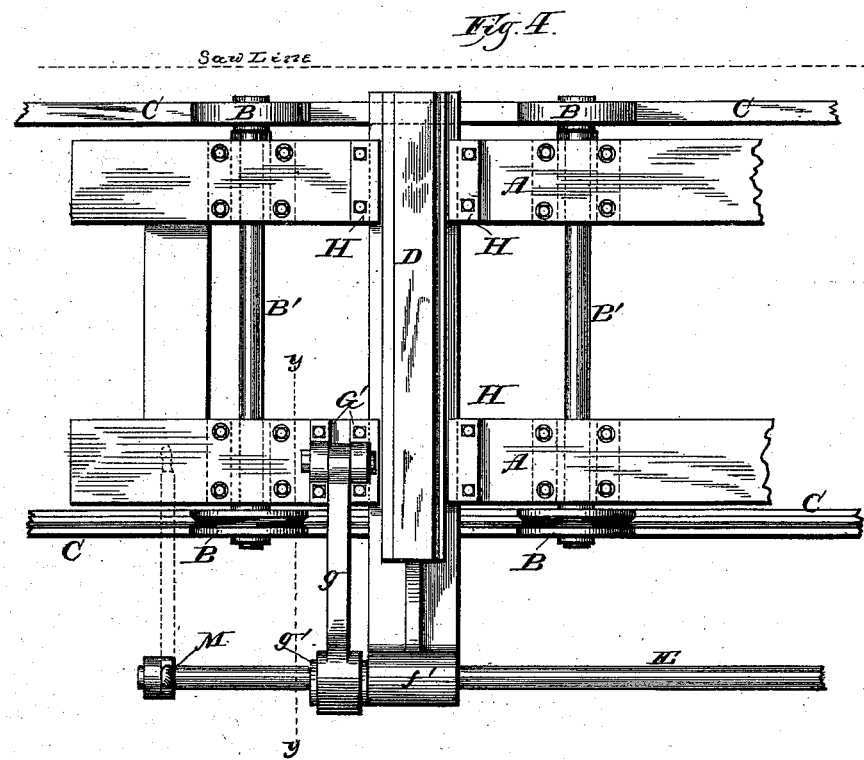
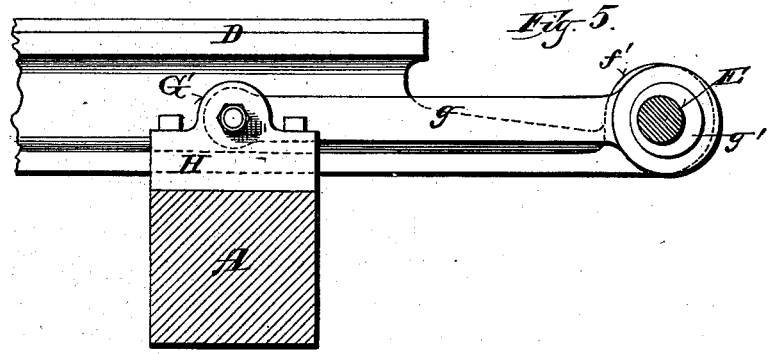
Witnesses:
Chas. R. Goss.
James G. Alunder
Inventor:
William Gowen

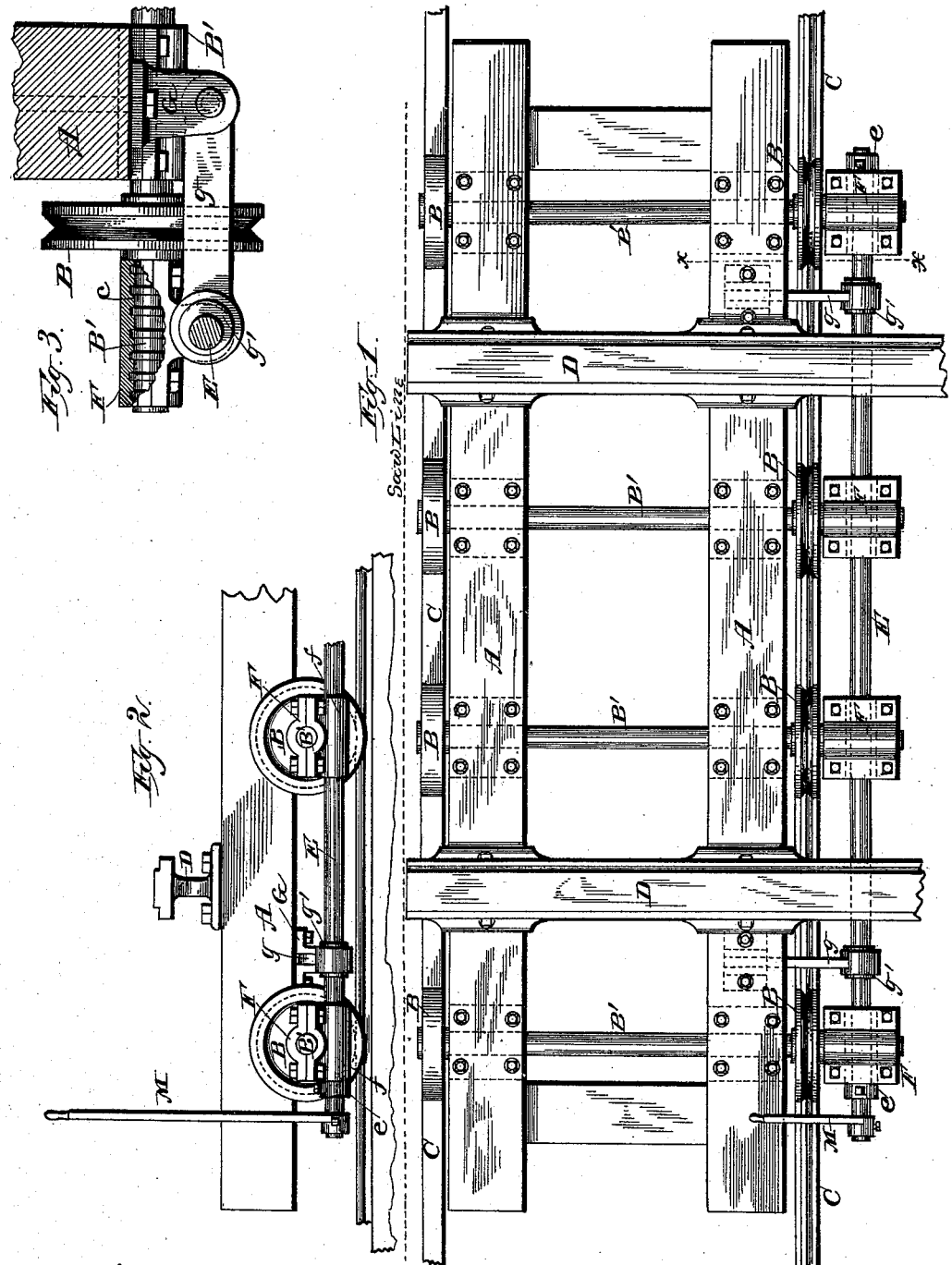

UNITED STATES PATENT OFFICE.

WILLIAM GOWEN, OF WAUSAU, WISCONSIN.

OFFSETTING DEVICE FOR SAW-MILL CARRIAGES.

SPECIFICATION forming part of Letters Patent No. 401,944, dated April 23, 1889.

Application filed December 27, 1886. Serial No. 222,607. (No model.)

*To all whom it may concern:*

Be it known that I, WILLIAM GOWEN, of Wausau, in the county of Marathon and State of Wisconsin, have invented certain new and useful Improvements in Offsetting Devices for Saw-Mill Carriages; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of my invention is to move the log away from the saw in "gigging" or running the carriage back.

It consists, essentially, of the combination, with the supporting-wheels and axles, of a log-supporting frame laterally adjustable thereon with reference to the line of travel of the carriage, and a lever connected with said frame and axles and arranged, under the control of the operator, to shift the log toward and away from the saw.

In the accompanying drawings like letters designate the same parts in the several figures.

Figure 1 is a plan view of a saw-mill carriage embodying my improvements. Fig. 2 is a side elevation of a portion of the same. Fig. 3 is a detail view, on an enlarged scale, showing the rock-shaft and the adjacent side rail of the carriage in cross-section, taken on the line $x\ x$, Fig. 1, and the connections of said rock-shaft with the carriage axles and frame. Fig. 4 is a plan view of a portion of a saw-mill carriage with a modified arrangement of my improved offsetting device; and Fig. 5 is a cross-section taken on the line $y\ y$, Fig. 4.

Referring to Fig. 1 of the drawings, A represents the carriage or log-supporting frame, of the usual or any suitable form and construction, provided in the ordinary way with head-blocks D D, and mounted upon axles B' B' and wheels B B, which are arranged to travel upon rails C C, laid parallel with the plane of the saw. The wheels B B on the side of the carriage opposite the saw are grooved to run upon and engage with an inverted-V-shaped rail which retains said carriage-wheels upon the track and prevents lateral movement of the same and of their axles B' B'.

The frame A is made capable of a slight lateral movement upon its supporting-axles B' B', which at the side of the carriage opposite the saw are extended and grooved, as shown in Fig. 3, to receive and engage the internally-grooved boxes F F, the lower sections of which are formed with cross-boxes $f\,f$ to receive and furnish bearings for the rock-shaft E, placed lengthwise of the carriage parallel therewith.

The rock-shaft E is provided at or near its opposite ends with eccentrics $g'\ g'$, which are connected by means of links or bars $g\ g$ with brackets G G, which are attached to the adjacent side rail of the carriage-frame A, as shown in Fig. 3. Upon the shaft E is also fixed at a point conveniently accessible to the carriage "rider" or "setter" an actuating-lever, M, by means of which said shaft, with the eccentrics $g'\ g'$, is oscillated and the carriage-frame A shifted through the connecting-links $g\ g$ upon its supporting-axles B' B' toward and from the saw, as desired. The shaft E is held in place endwise by means of collars $e\ e$, fixed thereon and bearing at opposite ends against the boxes $f\,f$, as shown in Fig. 1.

Referring to Figs. 4 and 5, the carriage-frame A is allowed no lateral movement upon the axles B' B'; but the head-blocks D are mounted and arranged to slide longitudinally in blocks H H, secured upon the side rails of said carriage. The rock-shaft E is mounted in boxes $f'$, formed therefor in the overhanging tail ends of the head-blocks D, and the eccentrics $g'$ are connected by the links $g$ with brackets G', formed upon the adjacent blocks H, and secured to the upper face of the adjacent side rail of the carriage. The eccentrics $g'$ are so placed, as seen in Fig. 4, upon the shaft E as to prevent its endwise movement in its boxes $f'$.

It is obvious that the number and arrangement of the connections between the rock-shaft and carriage may be variously modified without departure from the spirit of my invention or effect upon its operation, which may be briefly described as follows: Before a cut is made by the saw the lever M is swung toward the carriage, thereby turning the shaft E and eccentrics $g'$ $g'$, and moving the carriage-frame A A, through the connecting-links $g$ $g$, upon its supporting-axles B' B' till the axle-boxes on the carriage-rail nearest the saw strike and bear against the hubs of the adjacent carriage-wheels B B, as seen in Fig. 1. After the cut is made and the saw has cleared the log the lever M is swung outwardly by the operator away from the carriage and the carriage-frame A is, in the manner just described, shifted in the opposite direction upon its supporting-axles B' away from the saw, and the log thereby carried out of contact therewith while the carriage is run or "gigged" back.

The lever M may be arranged to be operated automatically and other devices than those shown may be employed to connect the rock-shaft with the carriage-frame or log-support and the carriage-axles.

I do not claim herein the combination of the carriage-frame laterally adjustable upon its supporting wheels and axles, eccentrics connected with said frame and wheels and axles, and mechanism connected with and arranged to operate said eccentrics and to move said carriage-frame lengthwise of its supporting-axles, but make that the subject-matter of an application for United States Letters Patent Serial No. 215,461, filed October 5, 1886.

I claim—

The combination, in a saw-mill carriage, with a guiding-track, of a log-supporting frame, and its wheels and axles having a fixed position transversely to said track, cross-boxes mounted upon said axles and restrained from endwise movement thereon, a rock-shaft journaled lengthwise of said carriage in said cross-boxes and connected with said log-supporting frame, and a lever connected with said rock-shaft and arranged to turn the same and to move said log-supporting frame transversely with reference to the track upon which the carriage travels, substantially as and for the purposes set forth.

In testimony that I claim the foregoing as my own I affix my signature in presence of two witnesses.

WILLIAM GOWEN.

Witnesses:
CHAS. L. GOSS,
R. PLATZ.